(12) United States Patent
Oyama

(10) Patent No.: US 7,474,723 B2
(45) Date of Patent: Jan. 6, 2009

(54) DSRC COMMUNICATION CIRCUIT AND COMMUNICATION METHOD

(75) Inventor: Shigeki Oyama, Yokohama (JP)

(73) Assignee: Panasonic Corporation, Osaka (JP)

(*) Notice: Subject to any disclaimer, the term of this patent is extended or adjusted under 35 U.S.C. 154(b) by 518 days.

(21) Appl. No.: 11/095,669

(22) Filed: Apr. 1, 2005

(65) Prior Publication Data
US 2005/0220150 A1    Oct. 6, 2005

(30) Foreign Application Priority Data
Apr. 6, 2004   (JP) .............................. 2004-112495

(51) Int. Cl.
*H04L 7/00* (2006.01)
(52) U.S. Cl. .................. 375/368; 375/366; 375/363; 375/365; 375/370; 370/509
(58) Field of Classification Search ................ 375/368, 375/366, 365, 363, 370; 370/509
See application file for complete search history.

(56) References Cited

U.S. PATENT DOCUMENTS 6,009,131 A * 12/1999 Hiramatsu ................... 375/354
6,317,441 B1 * 11/2001 Nakajima .................... 370/509
6,625,125 B1 *  9/2003 Hagiwara .................... 370/251
2001/0024948 A1 *  9/2001 Yamashita .................... 455/352

FOREIGN PATENT DOCUMENTS

| JP | 09289499 | 11/1997 |
| JP | 11346378 | 12/1999 |
| JP | 2000332719 | 11/2000 |
| JP | 2001036458 | 2/2001 |
| JP | 2001274741 | 10/2001 |

* cited by examiner

*Primary Examiner*—Shuwang Liu
*Assistant Examiner*—Kabir A Timory
(74) *Attorney, Agent, or Firm*—Dickinson Wright, PLLC

(57) ABSTRACT

A DSRC communication technology that prevents unique word detection errors even when the frame changes in data reception and the timing of the unique word detection window and the timing of the received data do not match, and that adjusts the data transmission timing in a flexible fashion when the slot timing deviates from the frame timing. In this technology, bit counter 111 generates the frame timing from the frame synchronization signal, and bit counter 112 generates the sot timing in response to the slot synchronization signal. The unique word detection window is generated from the frame timing and the received data operation timing and the data reception timing are generated from the slot timing. In addition, the data transmission timing and the transmission data operation timing are generated based on one of the frame timing and the slot timing chosen in selector 123.

7 Claims, 5 Drawing Sheets

DSRC COMMUNICATION CIRCUIT AND COMMUNICATION METHOD

BACKGROUND OF THE INVENTION

1. Field of the Invention

The present invention relates to a DSRC (Dedicated Short Range Communication) communication circuit and communication method for use in DSRC wireless systems.

2. Description of Related Art

ETC (Electronic Toll Collection) systems, incorporated today in ITS (Intelligent Transport Systems), employ DSRC wireless systems that comply with the standard ARIB-STD-T55. In DSRC wireless systems, a transmission frame is formed with a plurality of slots of an equal width so as to enable TDMA (Time Division Multiple Access) methods of synchronization control. In addition, the standard ARIB-STD-T75, issued recently, proposes a DSRC communication system that changes the modulation method per slot in a frame.

A typical timing generation method employed in a DSRC communication circuit used in conventional DSRC wireless systems uses one bit counter and slot-synchronizes this bit counter at the unique word detection timing in each received slot and generates, from the count value in the slot-synchronized bit counter, the operation timings of received data (the operations including the CRC operation and simplified privacy scrambling), the data reception timing for taking the received data after the operations into a reception buffer, the timing of the unique word detection window in the next received slot, the data transmission timing, and the operation timings of transmission data (the operations including CRC operation and simplified privacy scrambling). See, for example only, Unexamined Japanese Patent Application Publication No. HEI09-289499.

However, conventional timing generation methods such as the one described above have at least the following problems. That is, in terms of data reception, slot synchronization is performed utilizing the unique word detection timing in the received slot, and the timing of the next unique word detection window is generated. Consequently, when the slot timing deviates from the frame timing, the unique word detection timing in the corresponding received slot will also deviate, and the gap between the frame timing and the slot timing will show in the timing of the unique word detection window in the next received slot.

So, when one frame of data communication is over and data reception in the fist slot of the following frame is performed, despite the fact that the relationship (gap) between the frame timing and the slot timing changes when the frame changes, the unique word detection window in the following frame is generated showing the gap between the frame timing and the slot timing in the previous frame. As a result, the timing of the received data and the timing of the unique word detection window do not match, causing a unique word detection error and eventually leading to the problem that processing such as waiting for data retransmission and continuous unique word reception need to be performed.

In addition, in terms of data transmission, as in data reception, slot synchronization is performed based on the unique word detection timing in the received slot using one bit counter, and the data transmission timing and the operation timing of transmission data are generated from the count value in the slot-synchronized bit counter. Consequently, when the slot timing deviates from the frame timing, the timing of slot synchronization will also deviate from the frame timing, and, as a result, the data transmission timing and transmission data operation timing will be generated in timings that deviate from the frame timing.

Now, to offer a solution to the resulting problem of incompatibility and communication errors between vehicles of various manufacturers mounting DSRC systems and roadside equipment, it is necessary to be able to perform data transmission in synch with the frame timing. Still, conventionally, it is not possible to perform data transmission in synch with the frame timing, and so improvement is desired.

SUMMARY OF THE INVENTION

An object of the present invention is therefore to provide a DSRC communication circuit and communication method that prevents unique word detection errors even when the frame changes in data reception and the timing of the unique word detection window and the timing of received data do not match, and that flexibly adjusts the data transmission timing when the slot timing deviates from the frame timing.

The present invention is designed to use two bit counters, and perform synchronization with the frame timing and synchronization with the slot timing separately, generate the frame timing and the slot timing, generate the unique word detection window in all received slots in the frame from the frame timing, and generate the operation timing of the received data and data reception timing from the slot timing, so that, when the timing of the received data and the timing of the unique word detection window do not match due to the gap between the frame timing and the slot timing, the present invention prevents the mismatch showing in the next slot and prevents unique word detection errors.

Furthermore, according to the present invention, a choice can be made as to which one of the frame timing and the slot timing to use to generate the data transmission timing, thereby making it possible to adjust the transmission timing and allowing data transmission at optimal timings, thus offering a solution to the problem of incompatibility and communication errors between vehicles of various manufacturers mounting DSRC systems and roadside equipment.

According to an aspect of the invention, a DSRC communication circuit has: a unique word detector that detects, in a plurality of slots forming a frame, respective unique words in accordance with a unique word detection window; a first bit counter that performs a frame synchronization in response to a unique word detection signal corresponding to a first slot in the frame, the detection signal being outputted from the unique word detector, counts a period until a unique word detection signal corresponding to a first slot in a next frame arrives as input, and generates a frame timing; a second bit counter that, in response to unique word detection signals corresponding to all slots including the fist slot, the detection signals being outputted from the unique word detector, performs a slot synchronization on a per unique word detection signal basis and counts a period until a unique word detection signal corresponding to the next slot arrives as input, and generates a slot timing; and a timing generator that generates a unique word detection window based on the frame timing, generates a processing timing of received data based on the slot timing, and generates a processing timing of transmission data based on one of the frame timing and the slot timing.

According to another aspect of the present invention, a communication method in a DSRC communication system has: a first step of detecting, in a plurality of slots forming a frame, respective unique words in accordance with a unique word detection window; a second step of sending a unique word detection signal corresponding to a first slot in the plurality of slots forming the frame to a first bit counter and performing a frame synchronization, and counting by mans of the first bit counter a period until a unique word detection signal corresponding to a first slot in a next frame arrives as input and generating a frame timing; a third step of sending unique word detection signals corresponding to all slots including the fist slot to a second bit counter, performing a slot synchronization on a per unique word detection signal basis, and counting by means of the second bit counter a period until a unique word detection signal corresponding to the next slot arrives as input, and generating a slot timing; and a fourth step of generating a unique word detection window based on the frame timing and generating a processing timing of received data based on the slot timing.

According to still another aspect of the invention, a communication method in a DSRC communication system has: a first step of detecting, in a plurality of slots forming a frame, respective unique words in accordance with a unique word detection window; a second step of sending a unique word detection signal corresponding to a first slot in the plurality of slots forming the frame to a first bit counter and performing a frame synchronization, and counting by mans of the first bit counter a period until a unique word detection signal Corresponding to a first slot in a next frame arrives as input and generating a frame timing; a third step of sending unique word detection signals corresponding to all slots including the fist slot to a second bit counter, performing a slot synchronization on a per unique word detection signal basis, and counting by means of the second bit counter a period until a unique word detection signal corresponding to the next slot arrives as input, and generating a slot timing; and a fourth step of generating a processing timing of transmission data based on one of the frame timing and the slot timing.

BRIEF DESCRIPTION OF THE DRAWINGS

The above and other objects and features of the invention will appear more fully hereinafter from a consideration of the following description taken in connection with the accompanying drawings, in which.

DESCRIPTION OF PREFERRED EMBODIMENTS

Now, embodiments of the present invention will be described below in detail with reference to the accompanying drawings.

Figure 1:
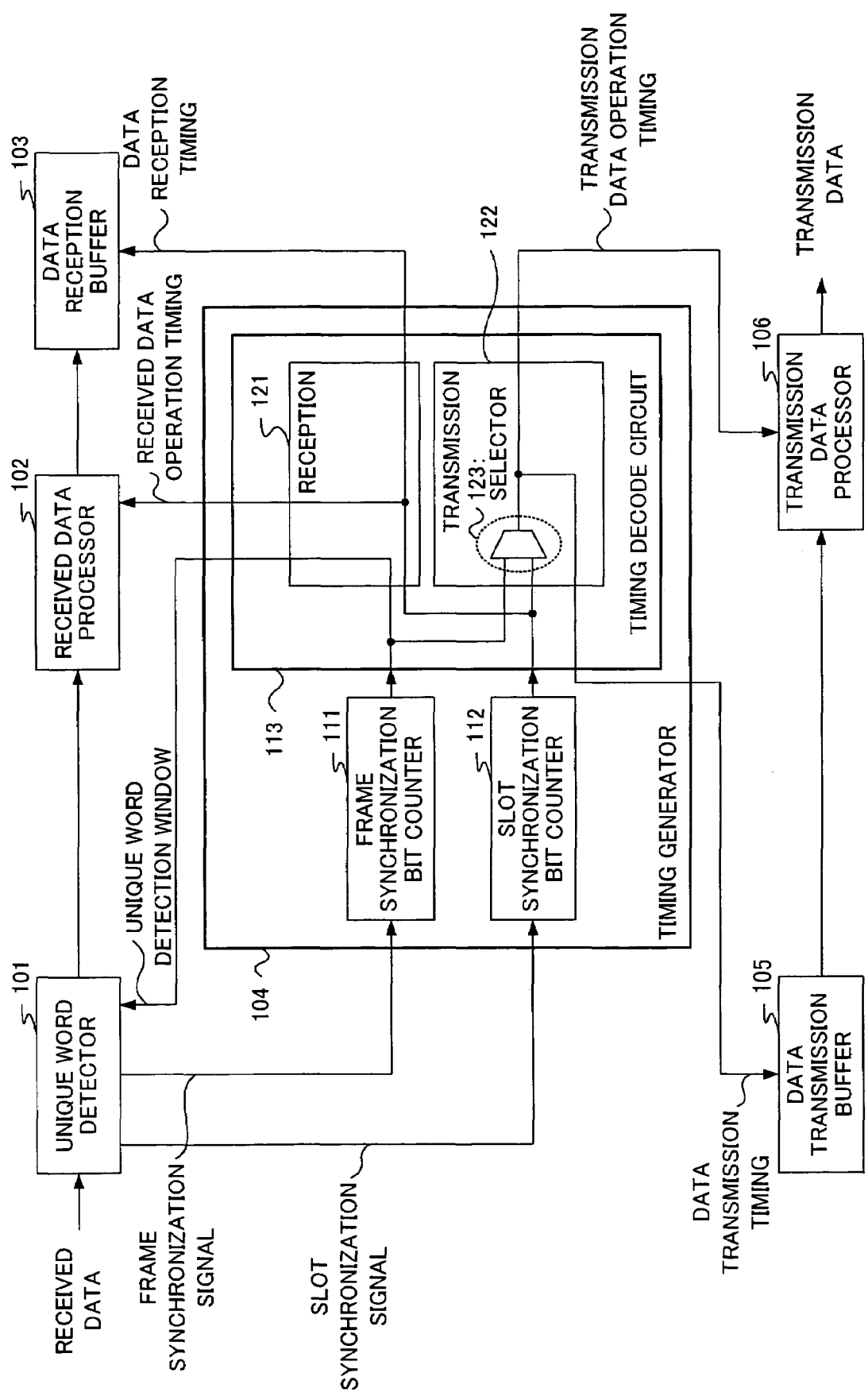
FIG. 1 is a block diagram showing a configuration of a DSRC communication circuit according to an embodiment of the present invention.

FIG. 1 is a block diagram showing a configuration of a DSRC communication circuit according to an embodiment of the present invention.

In accordance with DSRC communication standards, when data is received in slots, the bit sequence behind the unique word is applied operation processing including simplified privacy scrambling. In addition, CRC operation needs to be performed for data consistency. In addition, data reception requires the operation of taking the data that is needed in a reception buffer. Consequently, in data reception, first, it is necessary to perform unique word detection and learn the timing of received data.

In addition, there may be cases where the bit sequence of a unique word and the bit sequence of normal received data match by chance and unique word detection is performed at a wrong timing. To prevent such situations and perform proper unique word detection, therefore, it is necessary to generate the timing of the unique word detection window such that the unique word and the bit sequence of the received data are distinguishable. In addition, it is also necessary to generate the received data operation timing for applying operations such as simplified privacy scrambling and CRC checking in the bit sequence behind the unique word detected and the operator of the data receiving circuit, and the data reception timing for taking into the reception buffer the data that is applied these operations.

Furthermore, the timing of the received data—that is, the slot timing—is supposed to maintain certain relationships with the frame timing in accordance with DSRC standards. However, there are cases where the slot timing deviates from the frame timing due to the influence of the environment in which DSRC communication is performed. So, in order to receive data, it is necessary to perform timing generation for data reception in all received slots, regardless of the frame timing.

In addition, in transmission processing, there are cases where vehicles of various manufacturers mounting DSRC systems and roadside equipment are incompatible with each other and suffer communication errors. As a solution to this problem, it is necessary to be able to adjust transmission timing so as to perform data transmission at optimal timings.

Now, the DSRC communication circuit shown in FIG. 1 has unique word detector 101, in which received data is inputted, received data processor 102, data reception buffer 103, timing generator 104, data transmission buffer 105, and transmission data processor 106 that performs transmission data generation processing and outputs the result.

Timing generator 104 includes frame synchronization bit counter 111, slot synchronization bit counter 112, and timing decode circuit 113 in its configuration. Timing decode circuit 113 includes reception timing decode circuit 121 and transmission timing decode circuit 122 in its configuration.

Unique word detector 101 detects the unique word included in the received data in each received slot that is inputted, utilizing the unique word detection window generated in timing generator 104. The unique word detection window is a gate of a predetermined width, provided not to allow unique word detection at wrong timing when the bit sequence of the unique word and the bit sequence of the received data match by chance.

When the unique word is detected in the first slot of the frame, a detection signal is sent to frame synchronization bit counter 111 as a frame synchronization signal. The frame synchronization is performed thus. In addition, regardless of whether or not it is the first slot of the frame, the unique word detection signal in each slot is sent to slot synchronization bit counter 112. The slot synchronization is performed thus. After the frame synchronization and slot synchronization, these two bit counters count up the received clocks, thereby generating the frame timing and slot timing (see FIG. 2).

In accordance with the received data operation timing generated in timing generator 104, received data processor 102 undoes the simplified privacy scrambling applied to the bit sequence in the received slot behind the unique word in accordance with DSRC communication standards and performs CRC operation.

The received data processed in received data processor 102 is stored in data reception buffer 103 in accordance with the data reception timing generated in timing generator 104.

In data transmission buffer 105, transmission data stored therein is read out in accordance with the data transmission timing generated in timing generator 104 and sent to transmission data processor 106.

In accordance with the transmission data operation timing generated in timing generator 104, transmission data processor 106 applies simplified privacy scrambling and CRC operation in accordance with DSRC communication standards to the bit sequence behind the unique word in transmission data sent from data transmission buffer 105.

In timing generator 104, frame synchronization bit counter 111 synchronizes with the frame utilizing the frame synchronization signal inputted from unique word detector 101, counts the received clocks and generates the frame timing. Also, slot synchronization bit counter 112 synchronizes with the slot utilizing the slot synchronization signal inputted from unique word detector 101, counts the received clocks and generates the slot timing. These timings are inputted in reception timing decode circuit 121 and transmission timing decode circuit 122.

Reception timing decode circuit 121 generates the unique word detection window in unique word detector 101 from the frame timing, and generates the received data operation timing in received data processor 102 and data reception timing in data reception buffer 103 from the slot timing. In transmission timing decode circuit 122, the frame timing and the slot timing are inputted in selector 123. Selector 123 knows in advance which one to choose, and, from the frame timing or the slot timing selected in accordance with the configuration of selector 123, the data transmission timing in data transmission buffer 105 and the transmission data operation timing in transmission data processor 1106 are generated.

Figure 2:
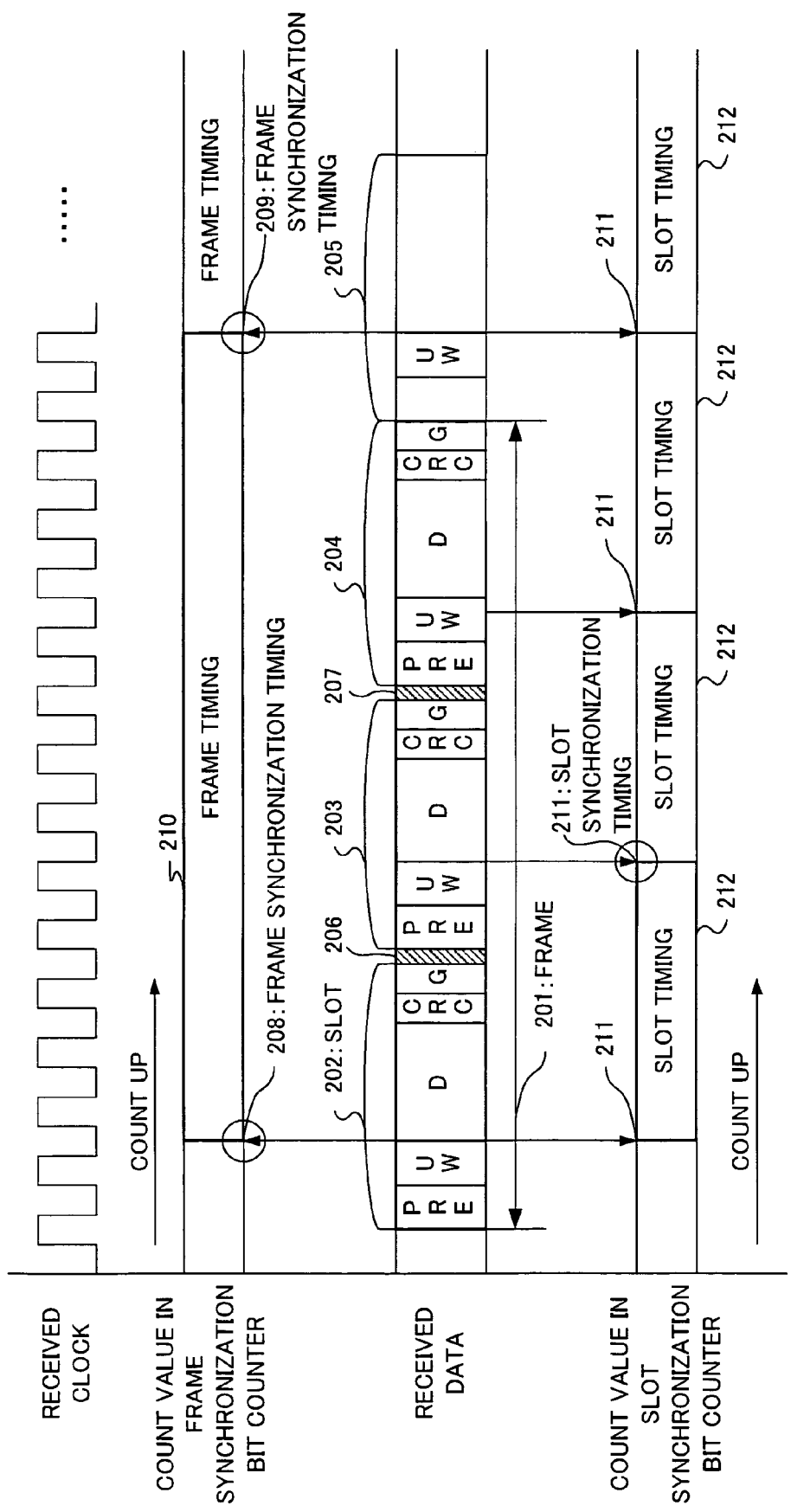
FIG. 2 illustrates the operation of generating frame synchronization timing and slot synchronization timing from received data using two bit counters.
Figure 3:
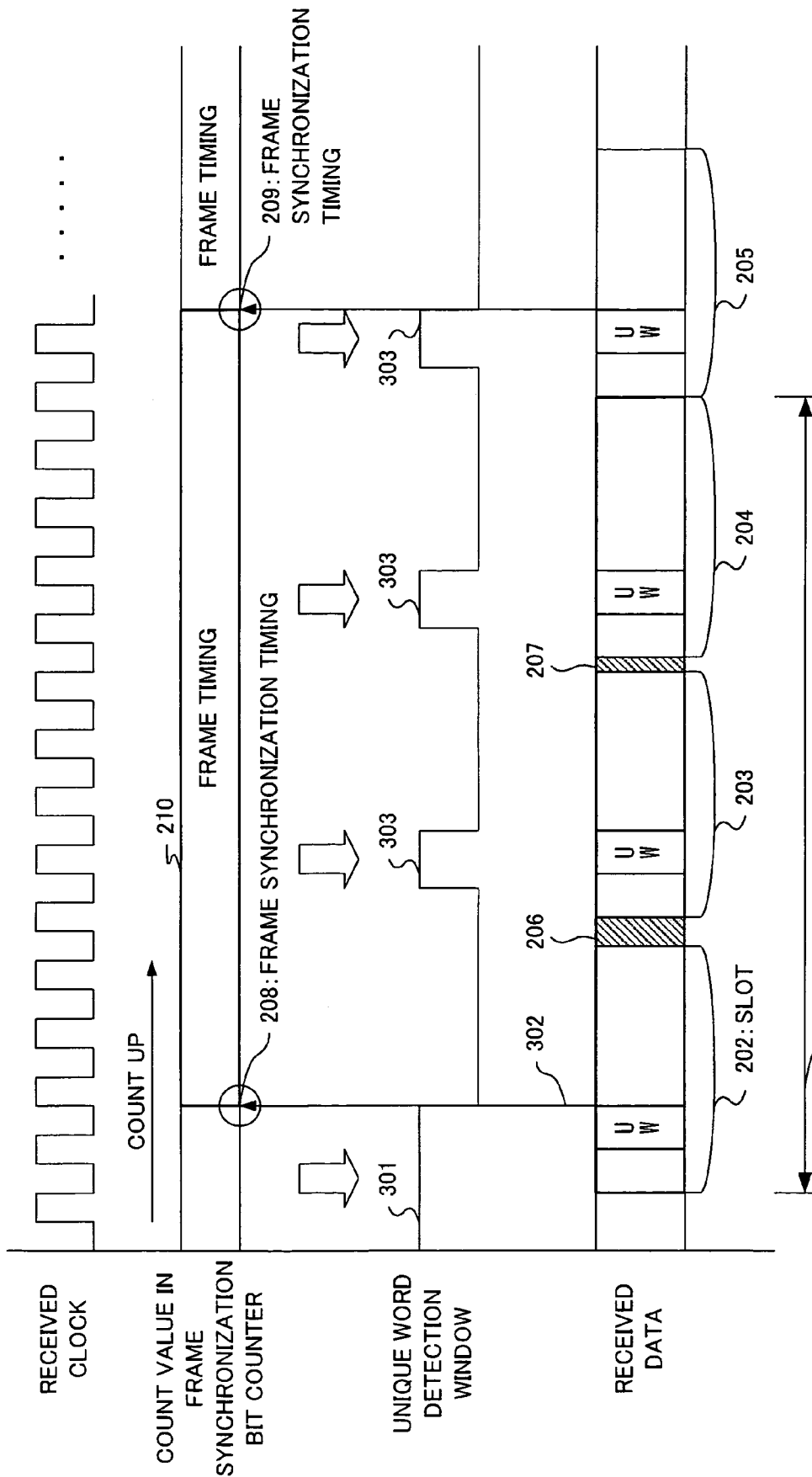
FIG. 3 illustrates the operation of generating unique word detection window from received data using frame timing.
Figure 4:
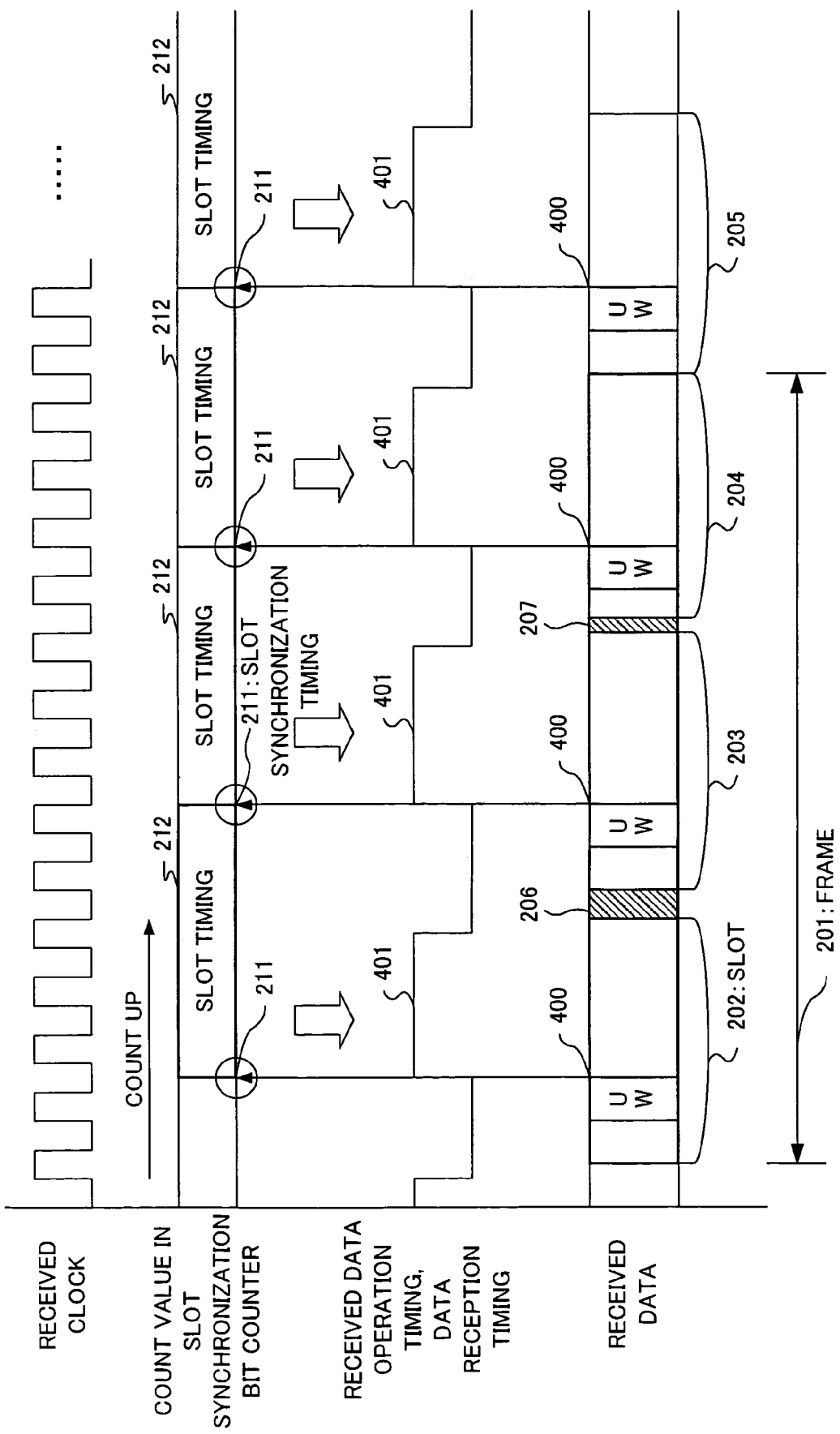
FIG. 4 illustrates the operation of generating received data operation timing and data reception timing from received data using slot timing.
Figure 5:
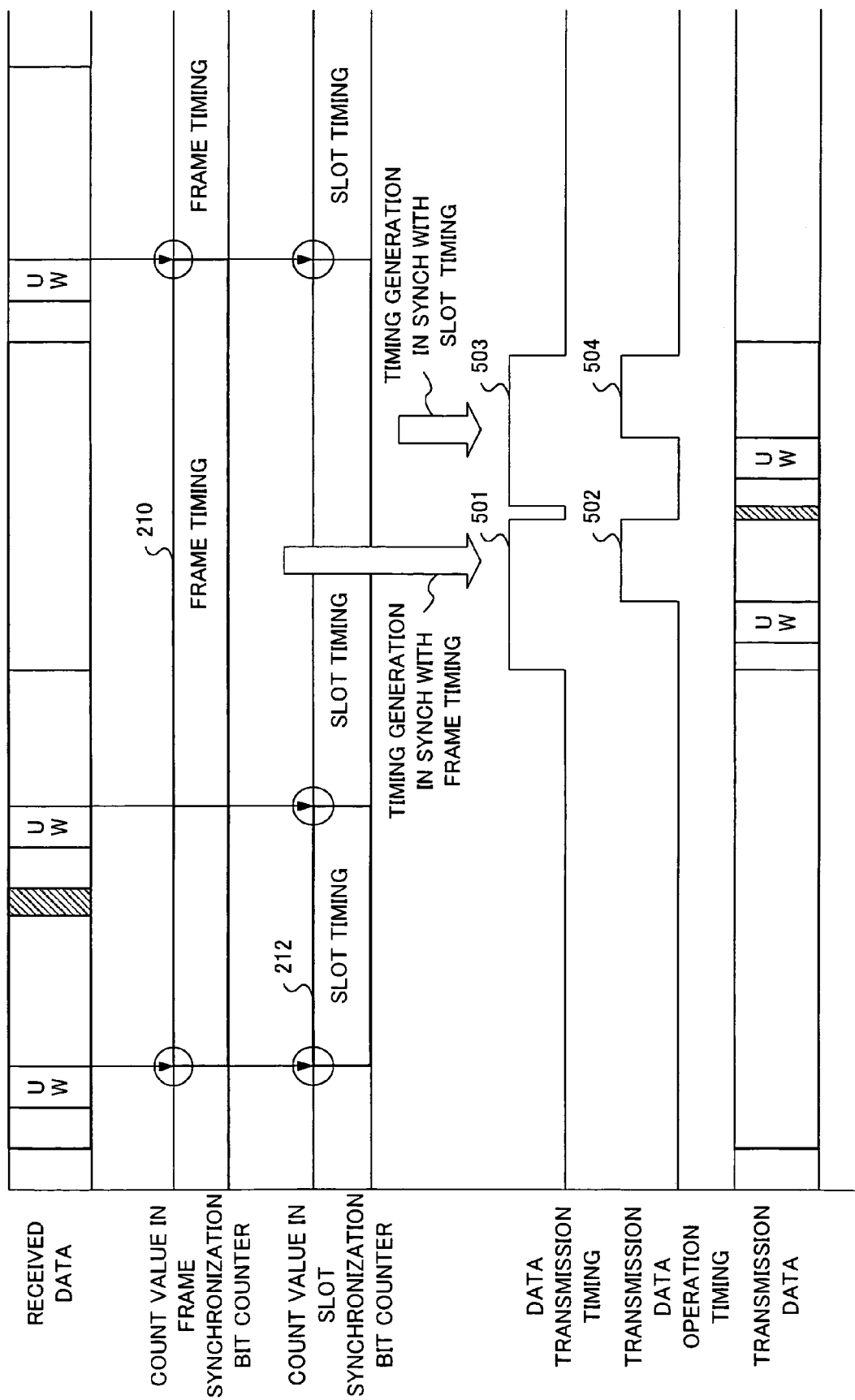
FIG. 5 illustrates the operation of generating data transmission timing and transmission data operation timing using frame timing and slot timing generated from received data.

Now, with reference to FIGS. 1-5, the timing generation operation in timing generator 104 will be described. FIG. 2 illustrates the operation of generating the frame synchronization timing and the slot synchronization timing from received data by means of two bit counters. FIG. 3 illustrates the operation of generating the unique word detection window from received data using the frame timing. FIG. 4 illustrates the operation of generating the received data operation timing and the data reception timing from received data using the slot timing. FIG. 5 illustrates the operation of generating the data transmission timing and the transmission data operation timing using the frame timing and the slot timing generated from received data.

FIG. 2 illustrates the relationships between received clocks, the count value in frame synchronization bit counter 111 (i.e. frame timing), the received data in the slots, and the count value in frame synchronization bit counter 112 (i.e. slot timing).

In FIG. 2, frame 201 is formed with a combination of a plurality of transmission slots and received slots (in the figure, three slots 202, 203 and 204). However, in FIG. 2, slots 202, 203, and 204 are all received slots. Incidentally, slot 205 is the first slot in the next frame.

Each slot is formed with a preamble (PRE), unique word (UW), data (D), error check CRC (CRC), and guard time (G). In addition, there is interval 206 between slot 202 and slot 203, and also there is interval 207 between slot 203 and slot 204.

Unique word detector 101 detects the unique word (UW) in slots 202, 203, 204 and 205, in accordance with the unique word detection window (see FIG. 3). In frame synchronization bit counter 111, the unique word detection signals in the first slot in the frames (slot 202 and slot 205) are inputted as frame synchronization signals. In slot synchronization bit counter 112, the unique word detection signals in slots 202, 203, 204 and 205 are inputted as slot synchronization signals.

Frame synchronization bit counter 111 performs the count-up operation from the initial value in accordance with the received clocks, starting from the timing the frame synchronization signal—that is, the unique word detection signal in first slot 202 in the frame—is inputted as the frame synchronization timing 208. Likewise, frame synchronization bit counter 111 repeats the count-up operation from the initial value in accordance with the received clocks, starting from the timing the next frame synchronization signal—that is, the unique word detection signal in first slot 205 in the next frame—is inputted as frame synchronization timing 209. Consequently, the count value gives frame timing 210, which is the frame period.

Slot synchronization bit counter 112 repeats the count-up operation from the initial value in accordance with the received clocks, starting from the timing the slot synchronization signal of each slot is inputted as slot synchronization timing 211. Consequently, the count value gives slot timing 212, which is the slot period.

Slot timing 212, which gives the processing period of the received data, is supposed to maintain certain relationships to frame timing 210 in accordance with DSRC communication standards. However, depending on the influence of the environment in which DSRC communication is performed, intervals 206 and 207 may be created between received slots. In that case, slot timing 212 deviates from frame timing 210. In FIG. 2, the slot timings of slots 202, 203 and 204 are all given the same code 212. However, when there are intervals 206 and 207, they may not have the same code.

Referring again to FIG. 2, in conventional cases, based on the detection of the unique word UW in slot 202, the detection window for the unique word UW in next slot 203 is generated. Likewise, based on the detection of the unique word UW in slot 203, the detection window for the unique word UW in next slot 204 is generated. As a result, the detection window for the unique word UW in slot 203 is generated including the deviation of interval 206, and the detection window for the unique word UW in slot 204 is generated such that the deviation of interval 206 shows in the deviation of interval 207.

According to this method, the detection window for the unique word UW in the first slot of a frame is generated based on the detection of the unique word UW in the last slot in the previous frame, and so the timing of the unique word UW in the received data and the timing of the window for detecting this unique word UW do not match, thereby causing a unique word detection error.

So, according to the present embodiment, in terms of data reception, the window for detecting the unique word UW is generated based on frame timing 210, so that, when the slot timing has a deviation, this will not in the relationship between the slot timing and the frame timing (see FIG. 3). Then, without regard to frame timing 210, the timing for data reception processing is generated in all received slots (see FIG. 4).

In addition, in conventional cases, the transmission timing is generated from slot timing 212. However, if slot timing 212 deviates from frame timing 210 such as described above, the transmission processing is performed in this deviated timing. As a result, there have been cases of problems where vehicles of various manufacturers mounting DSRC systems and roadside equipment are not compatible with each other and suffer communication errors.

So, according to the present embodiment, in terms of transmission processing, as shown in FIG. 1, one of the frame timing and the slot timing can be chosen and configured by means of selector 123, and the timing for transmission processing is generated in accordance with whichever timing that is selected (see FIG. 5).

Next, FIG. 3 illustrates the relationships between the received clocks, the count value in frame synchronization bit counter 111 (i.e. frame timing), the unique word detection window, and the received data.

In FIG. 3, the count value in frame synchronization bit counter 111 is frame timing 210. Frame timing 210 is generated in accordance with the received clocks, defining the period between frame synchronization timing 208, which is when the frame synchronization signal—that is, the unique word detection signal in first slot 202 in the frame—is inputted, and frame synchronization timing 209, which is when the next frame synchronization signal—that is, the unique word detection signal in first slot 205 in the next frame—is inputted. There is no frame timing 210 in the first round after communication begins.

So, in the first round after communication begins, unique word detection window 301 is configured with an open gate, and the process continues waiting until the unique word UW is detected in first received slot 202 in the frame. When the unique word UW is detected in first received slot 202 in the frame, unique word detection window 301 closes its gate at unique word detection timing 302. At the same time, frame synchronization bit counter 111 synchronizes with the frame and counts up the received clocks, thereby enabling generation of frame timing 210.

Then, using the count value over the process frame synchronization bit counter 111 counts up, the timing generation for unique word detection window 303 for following received slots 203 and 204 is performed. Unique word detection window 303 for the slots after the first slot is generated to rise in the preamble period and fall at the end of the unique word in each slot.

In second and later frame receptions, the unique word detection window can be generated using frame timing 210 generated in the first reception, so that unique word detection window 303 with a narrow gate width generated in the first reception can be generated as the unique word detection window in the first received slot in these frames. Consequently, in second and later frame receptions, the timing generation for unique word detection window 303 in all received slots including the first slot in the frames is performed using frame timing 210.

By this means, when there are intervals 206 and 207 between the slots and the slot timing has a deviation from frame timing 210, the influence is little, and the timing generation with respect to the unique word detection window is still possible. In addition, when the frame changes, the timing generation with respect to the unique word detection window in accordance with frame timing 210 is possible.

Next, FIG. 4 illustrates the relationships between the received clocks, the count value in slot synchronization bit counter 112 (i.e. slot timing), the received data operation timing and the data reception timing, and the received data. In FIG. 4, as described above, slot synchronization bit counter 112 counts up the received clocks from unique word detection timing 400 in each received slot as slot synchronization timing 211, thereby being able to generate slot timing 212 in each received slot. In addition, the received data operation timing and data reception timing 401 are generated using the above slot timing 212.

The received data operation timing and data reception timing 401 are generated to cover the period from unique word detection timing 400 to the end of the corresponding received slot. Consequently, even when there are intervals 206 and 207, the period of these intervals has little influence, and received data processor 102 correctly undoes the simplified privacy scrambling applied to the bit sequence behind the unique word UW and performs CRC operation.

Next, FIG. 5 illustrates the relationships between received data, the count value in frame synchronization bit counter 111 (i.e. frame timing), the count value in slot synchronization bit counter 112 (i.e. slot timing), data transmission timing, transmission data operation timing, and transmission data.

In FIG. 5, data transmission timing 501 and transmission data operation timing 502 are generated using frame timing 210, which is the count value in frame synchronization bit counter 111. Meanwhile, data transmission timing 503 and transmission data operation timing 504 are generated using slot timing 212, which is the count value in slot synchronization bit counter 112. The choice between using frame timing 210 and using slot timing 212 is made in accordance with the configuration of selector 123.

By this means, it is possible to make a choice between: extracting transmission data from data transmission buffer 105 in accordance with data transmission timing 501 generated using frame timing 210, and, in transmission data processor 106, performing simplified privacy scrambling and CRC operation in accordance with transmission data operation timing 502 generated using frame timing 210 and transmitting the finalized transmission data; and extracting transmission data from transmission buffer 105 in accordance with data transmission timing 503 generated using slot timing 212, and, in transmission data processor 106, performing simplified privacy scrambling and CRC operation in accordance with transmission data operation timing 504 generated using slot timing 212 and transmitting the finalized transmission data.

In other words, in conventional cases, there have been only transmission methods that utilize the slot timing. However, according to the present embodiment, whether to generate data transmission timing 501 and transmission data operation timing 502 in synch with frame timing 210 or generate data transmission timing 503 and transmission data operation timing 504 in synch with slot timing 212 can be chosen and configured. Consequently, the present embodiment makes it possible to configure the transmission timing such that data transmission is performed at optimal timing, thus offering a solution to the problem of incompatibility and communication errors between vehicles of various manufacturers mounting DSRC systems and roadside equipment.

Thus, with respect to data reception, the present embodiment is designed to have two bit counters, perform synchronization with the frame timing and synchronization with the slot timing separately, generate the frame timing and the slot timing, generate the unique word detection window in all received slots in the frame from the frame timing, and generate the operation timing of the received data and data reception timing from the slot timing, so that, when the timing of the received data and the timing of the unique word detection window do not match due to the gap between the frame timing and the slot timing, the present embodiment prevents unique word detection errors and reduces the frequency the rate of data communication decreases.

In addition, with respect to data transmission, a choice can be made between using the frame timing of received data and using the slot timing of received data to generate the transmission timing of the data, thereby making it possible to adjust the transmission timing to allow data transmission at optimal timings, as a solution to the problem of incompatibility between vehicles of various manufacturers mounting DSRC communication systems and roadside equipment.

Thus, the present invention makes it possible to prevent unique word detection errors even when the frame changes in data reception and the timing of the unique word detection window and the timing of received data dot not match, and adjust the data transmission timing in a flexible fashion when the slot timing deviates from the frame timing.

That is, in accordance with one aspect of the present invention, the DSRC communication circuit of the present invention has: a unique word detector that detects, in a plurality of slots forming a frame, respective unique words in accordance with a unique word detection window; a first bit counter that performs a frame synchronization in response to a unique word detection signal corresponding to a first slot in the frame, the detection signal being outputted from the unique word detector, counts a period until a unique word detection signal corresponding to a first slot in a next frame arrives as input, and generates a frame timing; a second bit counter that, in response to unique word detection signals corresponding to all slots including the fist slot, the detection signals being outputted from the unique word detector, performs a slot synchronization on a per unique word detection signal basis and counts a period until a unique word detection signal corresponding to the next slot arrives as input, and generates a slot timing; and a timing generator that generates a unique word detection window based on the frame timing, generates a processing timing of received data based on the slot timing, and generates a processing timing of transmission data based on one of the frame timing and the slot timing.

By virtue of the above configuration, the present invention makes it possible to prevent unique word detection errors even when the timing of the unique word detection window and the timing of received data do not match when the frame changes in data reception. In addition, the transmission timing can be adjusted in a flexible fashion when the slot timing deviates from the frame timing.

In accordance with another aspect of the present invention, in the DSRC communication circuit of the present invention of the above configuration, the timing generator has a means that chooses and configures the frame timing or the slot timing.

By virtue of this configuration, it is possible arbitrarily configure as to which one of the frame timing and the slot timing to use to generate the data transmission timing.

In accordance with another aspect of the present invention, the communication method of the present invention for use in a DSRC communication system includes: a first step of detecting, in a plurality of slots forming a frame, respective unique words in accordance with a unique word detection window; a second step of sending a unique word detection signal corresponding to a first slot in the plurality of slots forming the frame to a first bit counter and performing a frame synchronization, and counting by mans of the first bit counter a period until a unique word detection signal corresponding to a first slot in a next frame arrives as input and generating a frame timing; a third step of sending unique word detection signals corresponding to all slots including the fist slot to a second bit counter, performing a slot synchronization on a per unique word detection signal basis, and counting by means of the second bit counter a period until a unique word detection signal corresponding to the next slot arrives as input, and generating a slot timing; and a fourth step of generating a unique word detection window based on the frame timing and generating a processing timing of received data based on the slot timing.

By virtue of the above method, it is possible to prevent unique word detection errors even when the frame changes in data reception and the timing of the unique word detection window and the timing of received data do not match.

In accordance with yet another aspect of the present invention, the communication method of the present invention for use in a DSRC communication system includes: a first step of detecting, in a plurality of slots forming a frame, respective unique words in accordance with a unique word detection window; a second step of sending a unique word detection signal corresponding to a first slot in the plurality of slots forming the frame to a first bit counter and performing a frame synchronization, and counting by mans of the first bit counter a period until a unique word detection signal corresponding to a first slot in a next frame arrives as input and generating a frame timing; a third step of sending unique word detection signals corresponding to all slots including the fist slot to a second bit counter, performing a slot synchronization on a per unique word detection signal basis, and counting by means of the second bit counter a period until a unique word detection signal corresponding to the next slot arrives as input, and generating a slot timing; and a fourth step of generating a processing timing of transmission data based on one of the frame timing and the slot timing.

By virtue of the above method, it is possible to adjust the data transmission timing in a flexible fashion when the slot timing deviates from the frame timing. In accordance with yet another feature of the present invention, in the above communication method of the present invention for use in a DSRC communication system, the fourth step further comprises a step of generating a processing timing of transmission data based on one of the frame timing and the slot timing.

By virtue of the above method, it is possible to prevent unique word detection errors when the frame changes in data reception and the timing of the unique word detection window and the timing of received data do not match. In addition, it is possible to adjust the data transmission timing in a flexible fashion when the slot timing deviates from the frame timing.

In accordance with yet another aspect of the present invention, in the above communication method of the present invention for use in a DSRC communication system, the fourth step further comprises a step of choosing and configuring the frame timing or the slot timing.

By virtue of this configuration, it is possible arbitrarily choose and configure as to which one of the frame timing and the slot timing to use to generate the data transmission timing.

Thus, in terms of data reception processing, the present invention makes it possible to prevent unique word detection errors when the frame changes in data reception and the timing of the unique word detection window and the timing of received data do not match. The present invention is therefore useful to reduce the frequency the rate of data communication decreases. In addition, in terms of data transmission processing, the present invention is useful in adjusting the data transmission timing in a flexible manner when the slot timing deviates from the fame timing.

Consequently, the present invention is in compliance not only with the T55 standard, which is a DSRC communication standard currently used in ETC services, but also with the T75 standard that includes the feature of changing the modulation method per slot in data transmission and reception in a frame.

Even if the T75 standard is expanded and the feature of the QPSK-VP (Varied Phase) modulation method is added thereto, the present invention will be still applicable. In addition, in case DSRC communication is performed over a plurality of roadside equipment, the present invention is still applicable as long as data communication is performed such that the plurality of roadside equipment maintain synchronization. So, when later in the future various services start that utilize DSRC communication technologies, the present invention will be effective and be of great use.

The present invention is not limited to the above described embodiments, and various variations and modifications may be possible without departing from the scope of the present invention.

This application is based on Japanese Patent Application No. 2004-112495 filed Apr. 6, 2004, entire content of which is expressly incorporated herein by reference.

What is claimed is:

1. A Dedicated Short Range Communication (DSRC) communication circuit comprising:
    a unique word detector that detects, in a plurality of slots forming a frame, respective unique words in accordance with a unique word detection window;
    a first bit counter that performs a frame synchronization in response to a unique word detection signal corresponding to a first slot in the frame, said detection signal being outputted from the unique word detector, counts a period until a unique word detection signal corresponding to a first slot in a next frame arrives as an input, and generates a frame timing;
    a second bit counter that, in response to unique word detection signals corresponding to all slots including the first slot, said detection signals being outputted from the unique word detector, performs a slot synchronization on a per unique word detection signal basis and counts a period until a unique word detection signal corresponding to the next slot arrives as an input, and generates a slot timing; and
    a timing generator that generates a unique word detection window based on the frame timing, generates a processing timing of received data based on the slot timing, and generates a processing timing of transmission data based on one of the frame timing and the slot timing.

2. The DSRC communication circuit of claim 1, wherein the timing generator chooses and configures the frame timing or the slot timing.

3. A communication method in a Dedicated Short Range Communication (DSRC) communication system, the method comprising:
    a first step of detecting, in a plurality of slots forming a frame, respective unique words in accordance with a unique word detection window;
    a second step of sending a unique word detection signal corresponding to a first slot in the plurality of slots forming the frame to a first bit counter and performing a frame synchronization, and counting with the first bit counter a period until a unique word detection signal corresponding to a first slot in a next frame arrives as an input and generating a frame timing;
    a third step of sending unique word detection signals corresponding to all slots including the first slot to a second bit counter, performing a slot synchronization on a per unique word detection signal basis, and counting with the second bit counter a period until a unique word detection signal corresponding to the next slot arrives as an input, and generating a slot timing; and
    a fourth step of generating a unique word detection window based on the frame timing and generating a processing timing of received data based on the slot timing.

4. A communication method in a Dedicated Short Range Communication (DSRC) communication system, the method comprising:
    a first step of detecting, in a plurality of slots forming a frame, respective unique words in accordance with a unique word detection window;
    a second step of sending a unique word detection signal corresponding to a first slot in the plurality of slots forming the frame to a first bit counter and performing a frame synchronization, and counting with the first bit counter a period until a unique word detection signal corresponding to a first slot in a next frame arrives as an input and generating a frame timing;
    a third step of sending unique word detection signals corresponding to all slots including the first slot to a second bit counter, performing a slot synchronization on a per unique word detection signal basis, and counting with the second bit counter a period until a unique word detection signal corresponding to the next slot arrives as an input, and generating a slot timing; and
    a fourth step of generating a processing timing of transmission data based on one of the frame timing and the slot timing.

5. The communication method of claim 3, wherein the fourth step further comprises a step of generating a processing timing of transmission data based on one of the frame timing and the slot timing.

6. The communication method of claim 4, wherein the fourth step further comprises a step of choosing and configuring the frame timing or the slot timing.

7. The communication method of claim 5, wherein the fourth step further comprises a step of choosing and configuring the frame timing or the slot timing.

* * * * *